US012621609B1

(12) United States Patent
Miesner et al.

(10) Patent No.: US 12,621,609 B1
(45) Date of Patent: May 5, 2026

(54) VOICE COIL SPEAKER WITH CONDUCTIVE COOLING

(71) Applicant: United States of America as Represented by the Secretary of the Navy, Arlington, VA (US)

(72) Inventors: John Miesner, Fairfax, VA (US); Matthew Willey, Boyds, MD (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 292 days.

(21) Appl. No.: 18/336,118

(22) Filed: Jun. 16, 2023

Related U.S. Application Data

(60) Provisional application No. 63/490,037, filed on Mar. 14, 2023.

(51) Int. Cl.
*H04R 9/02* (2006.01)
*H04R 7/12* (2006.01)
*H04R 9/04* (2006.01)
*H04R 9/06* (2006.01)

(52) U.S. Cl.
CPC ............... *H04R 9/022* (2013.01); *H04R 7/12* (2013.01); *H04R 9/046* (2013.01); *H04R 9/06* (2013.01); *H04R 2400/11* (2013.01)

(58) Field of Classification Search
CPC ...................................................... H04R 9/022
See application file for complete search history.

(56) References Cited

U.S. PATENT DOCUMENTS 6,327,371 B1 * 12/2001 Proni ..................... H04R 9/022 381/403
7,016,515 B2 3/2006 Ohashi
7,386,144 B2 6/2008 Vincent
7,433,485 B1 10/2008 Diedrich
7,729,504 B2 6/2010 Tsuda
7,835,538 B2 11/2010 Inoue
7,848,058 B2 12/2010 Huang
8,520,885 B2 8/2013 Tanabe
9,014,412 B2 4/2015 Humphreys
(Continued)

FOREIGN PATENT DOCUMENTS

EP 1202606 A2 * 5/2002 ............. H04R 9/022
KR 102146562 B1 * 8/2020 ............. H04R 9/046
WO WO-2012014084 A2 * 2/2012 ............. H04R 9/022

*Primary Examiner* — Carolyn R Edwards
*Assistant Examiner* — Dylan Maguire Neece
(74) *Attorney, Agent, or Firm* — Jesus J. Hernandez; U.S. Department of the Navy, Office of the General Counsel

(57) ABSTRACT

Example embodiments provide a voice coil speaker that may comprise a speaker frame and a diaphragm connected to the speaker frame and configured to be capable of axial movement. A heat conducting coil former may be connected to the diaphragm. A pole piece and a back plate may form an annular gap and conduct magnetic flux from an axially polarized permanent magnet in a complete loop that includes the annular gap. A voice coil may be wound on the heat conducting coil former and residing in the annular gap, the magnetic flux passing through the voice coil in the radial direction, such that the voice coil produces an axial force to cause the diaphragm to produce sound. A thermal bridge may be configured to conduct heat from the heat conducting coil former to the back plate.

13 Claims, 6 Drawing Sheets

(56) References Cited

U.S. PATENT DOCUMENTS

| | | | | |
|---|---|---|---|---|
| 9,025,808 | B2 | 5/2015 | Kwon | |
| 10,694,279 | B1 | 6/2020 | Danovi | |
| 11,013,101 | B2 | 5/2021 | MacDonald | |
| 11,395,070 | B2 | 7/2022 | Nozaki | |
| 11,611,830 | B2 | 3/2023 | O'Brien | |
| 2008/0285787 | A1 | 11/2008 | Szu-Wei | |
| 2010/0019584 | A1 | 1/2010 | Vercelli | |
| 2017/0070823 | A1* | 3/2017 | Permanian | H04R 9/025 |
| 2017/0280245 | A1 | 9/2017 | Little | |
| 2021/0352410 | A1* | 11/2021 | O'Brien | H04R 9/022 |

* cited by examiner

100

400a

VOICE COIL SPEAKER WITH CONDUCTIVE COOLING

CROSS-REFERENCE TO RELATED APPLICATIONS

This application claims the benefit of U.S. Provisional Application No. 63/490,037 filed Mar. 14, 2023, titled "Voice Coil Speaker with Conductive Cooling," incorporated herein by reference.

STATEMENT OF GOVERNMENT INTEREST

The following description was made in the performance of official duties by employees of the Department of the Navy, and, thus the claimed invention may be manufactured, used, licensed by or for the United States Government for governmental purposes without the payment of any royalties thereon.

TECHNICAL FIELD

The invention relates generally voice coil speakers.

BACKGROUND

Permanent magnet voice coil speakers employ a diaphragm which is vibrated by a current conducting coil that resides in a magnetic flux from one or more permanent magnets. The interaction between the current passing through the voice coil and the magnetic field causes the voice coil to oscillate in accordance with the electrical current and drive the diaphragm to produce sound.

Speaker design goals are to produce a high level of audio power with low distortion (high fidelity) in a compact size. One limitation on design is that the resistance of the voice coil produces heat which affects the fidelity and must be removed to prevent damage to the voice coil and other speaker components.

The current conducting coil of a voice coil speaker is typically wound onto a coil former that is made of a material with a low electrical conductivity such as paper or plastic. These materials typically have a low thermal conductivity of about 0.2 W/mK and therefore carry away little of the heat energy generated in the coil. Improved heat transfer can be realized by making the coil former from materials with a high thermal conductivity such as aluminum, with conductivity of 240 W/mk, or copper, with conductivity of 400 W/mK. Unfortunately, these materials also have a high electrical conductivity which causes two problems; the current in the coil induces a counter-current in the coil former which interacts with the magnetic field to produce forces that tend to cancel the coil forces, and the motion of the coil former relative to the magnetic field induces eddy currents in the coil former which retard the relative motion and produces heating and audio distortion.

Active cooling methods have been developed including forced air flow through the gap or liquid cooling of the coil or magnets. Although these methods are effective, they tend to increase cost and weight while reducing reliability.

SUMMARY OF THE INVENTION

Example embodiments provide a voice coil speaker that may comprise a speaker frame and a diaphragm connected to the speaker frame and configured to be capable of axial movement. A heat conducting coil former may be connected to the diaphragm. A pole piece and a back plate may form an annular gap and conduct magnetic flux from an axially polarized permanent magnet in a complete loop that includes the annular gap. A voice coil may be wound on the heat conducting coil former and residing in the annular gap, the magnetic flux passing through the voice coil in the radial direction, such that the voice coil produces an axial force to cause the diaphragm to produce sound. A thermal bridge may be configured to conduct heat from the heat conducting coil former to the back plate.

DETAILED DESCRIPTION OF THE INVENTION

Figure 1:
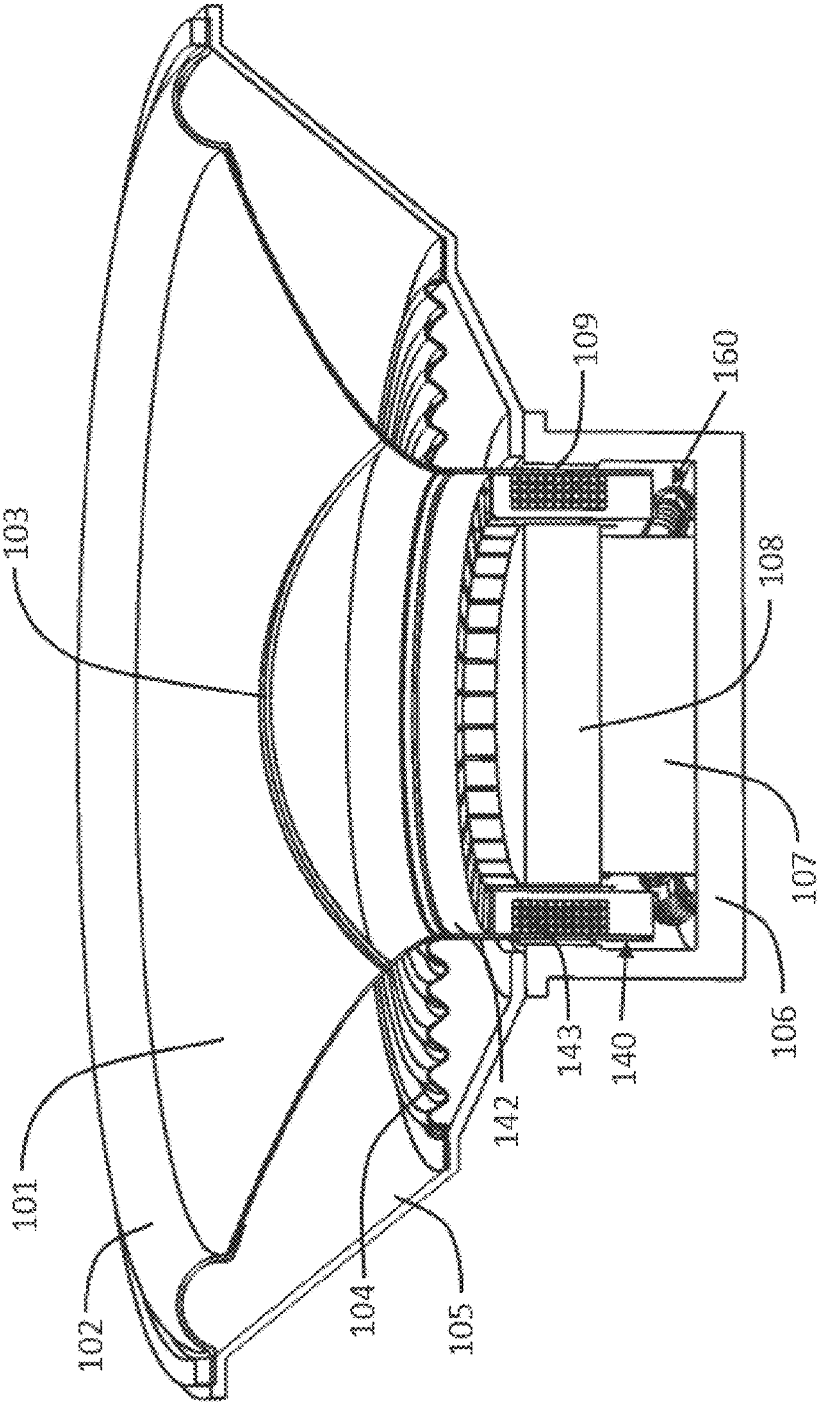
FIG. 1 is a cross-sectional view of the voice coil speaker illustrating the overall arrangement according to an example embodiment.

In the following description, for purposes of explanation and not limitation, specific details are set forth such as particular structures, designs, techniques, etc., in order to provide a thorough understanding of the example embodiments. However, it will be apparent to those skilled in the art that the disclosed subject matter may be practiced in other illustrative embodiments that depart from these specific details. In some instances, detailed descriptions of well-known elements and/or method are omitted so as not to obscure the description with unnecessary detail. All principles, aspects, and embodiments, as well as specific examples thereof, are intended to encompass both structural and functional equivalents of the disclosed subject matter. Additionally, it is intended that such equivalents include both currently known equivalents as well as equivalents developed in the future.

The following description refers to a voice coil speaker apparatus. However, it should be noted that the example embodiments shown and described herein are meant to be illustrative only and not limiting in any way. As such, various modifications will be apparent to those skilled in the art for application of example embodiments based on technologies other than the above, which may be in various stages of development and intended for future replacement of, or use with, the above described method or apparatus.

With respect to example embodiments, there is a need for a voice coil speaker with passive conductive cooling of the voice coil to prevent overheating and allow operation at higher power levels. Example embodiments provide a voice coil speaker of the type where a speaker frame supports a diaphragm on the lower edge with a flexible spider and on the top edge by an upper half roll compliance. Thus, the diaphragm may be prevented from radial movement and allowed to move axially by flexible mounts. The diaphragm may be connected to a coil former on which a current conducting voice coil is wound. The voice coil may reside in a magnetic flux from a permanent magnet. The interaction between the current passing through the voice coil and the magnetic field may cause the voice coil to oscillate in accordance with the electrical current and drive the diaphragm to produce sound.

Example embodiments provide a voice coil speaker of the type where an axially polarized permanent magnet may be attached to a speaker back plate and to a pole piece. The speaker back plate and the pole piece may be made from material with a high magnetic permeability and high saturation level such as steel. The speaker back plate and the pole piece may form an annular gap and conduct magnetic flux from the axially polarized permanent magnet in a complete loop that includes the annular gap. The voice coil may be in the annular gap and thus the magnetic flux may pass through the coil in the radial direction. Circumferential current through the voice coil may interact with the radial magnetic field to produce axial forces by the Lorentz effect.

In example embodiments, the coil former may be made of a material with high thermal conductivity, such as aluminum or copper, to passively cool the coil by transferring the heat axially from the coil to the speaker back plate through thermal bridges. The heat conducting coil former may include axial slits that prevent induction of a counter-current due to coil currents and eddy currents due to relative motion of the voice coil in the magnetic field. The speaker may include a thin sleeve made of nonconducting material, such as glass or carbon fiber composite, to reinforce the coil former and raise the strength and stiffness equal to or above that of a conventional solid former. The thin sleeve may be connected to and drives the diaphragm.

FIG. 1 is a cross-sectional view of the voice coil speaker 100 according to an example embodiment. As shown, the voice coil speaker 100 includes speaker frame 105 which supports diaphragm 101 on the lower edge with flexible spider 104 and on the top edge with flexible upper half roll compliance 102. The diaphragm 101 is thereby prevented from radial movement and allowed to move axially. Dust cap 103 is also connected to diaphragm 101 and moves with it.

Speaker frame 105 may be connected to and supported by speaker back plate 106. Axially polarized magnet 107 may be connected to speaker back plate 106. Pole piece 108 is connected to axially polarized magnet 107. Speaker back plate 106 and pole piece 108 are preferably made from material with a high magnetic permeability and high saturation level such as steel. Speaker back plate 106 and pole piece 108 form an annular gap 109 and conduct magnetic flux from axially polarized permanent magnet 107 in a complete loop that includes crossing the annular gap 109.

Voice coil assembly 140 may include reinforcing sleeve 142 which is connected to diaphragm 101 and thus constrained to move axially with it. Voice coil assembly 140 also includes voice coil 143 which is in the annular gap 109. Magnetic flux passes through voice coil 143 in the radial direction. Circumferential current through voice coil 143 interacts with the radial magnetic field to produce axial forces. These forces result in axial movement of voice coil assembly 140 and thereby axial movement of diaphragm 101 and dust cap 103, causing alternating compression and rarefaction of the contacting air to produce sound.

Thermal bridge 160 may conduct heat from voice coil assembly 140 to speaker back plate 106 without adding significantly to the overall axial stiffness of voice coil speaker 100.

Figure 2:
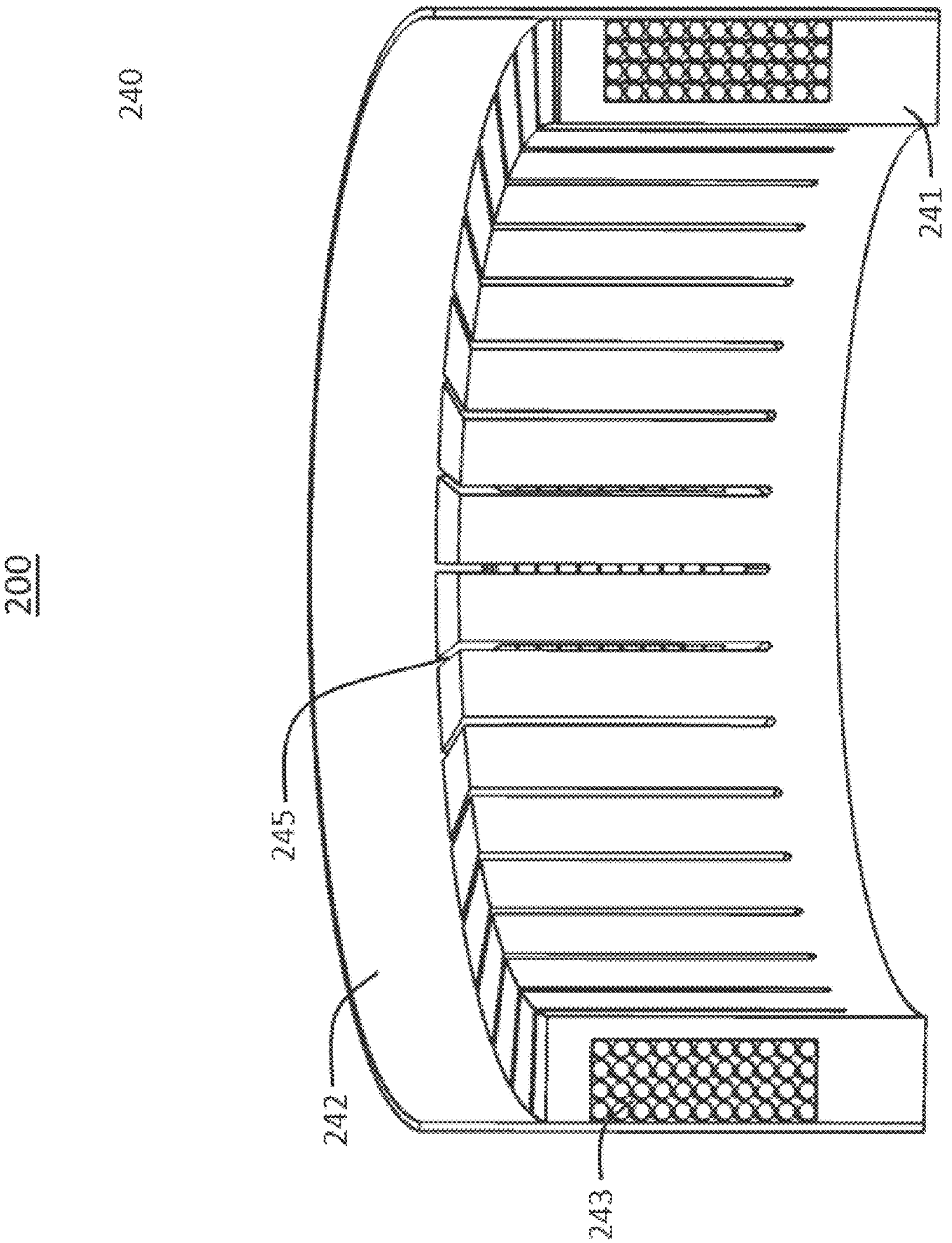
FIG. 2 is a cross-sectional view of the voice coil assembly according to an example embodiment.
Figure 3:
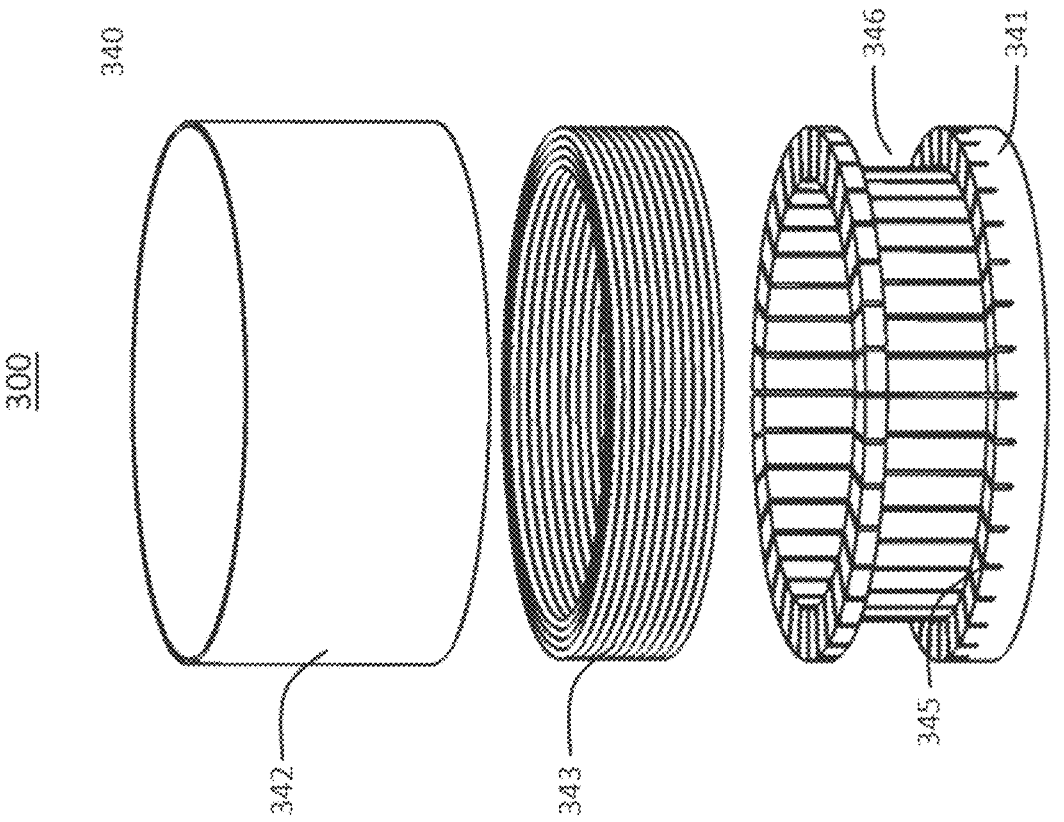
FIG. 3 is an exploded view of the voice coil assembly according to an example embodiment.

FIG. 2 is a cross-sectional view 200 of the voice coil assembly 240 according to an example embodiment. FIG. 3 is an exploded view 300 of the voice coil assembly 340 according to an example embodiment. FIG. 2 and FIG. 3 may depict the same example embodiment.

FIG. 2 is a cross-sectional view 200 of the voice coil assembly 240 illustrating a heat conducting coil former 241, a coil 243, and a reinforcing sleeve 242, according to an example embodiment. Voice coil assembly 240 includes heat conducing coil former 241 with axial slits 245 that prevent induction of a counter-current due to coil currents and eddy currents due to relative motion in the magnetic field. The slits may be of any convenient width appropriate to the manufacturing process. Slit cutting may be particularly well suited to Electrical Discharge Machining (EDM) which produces a slit width of about 0.1 to 0.3 mm. The optimum number and spacing of the slits may depend primarily on the frequency range of the speaker. For example, a low frequency speaker that produces up to about 200 Hz may have 8 slits while a higher frequency speaker that produces over 600 Hz may have 36 or more slits. The slit depth preferably extends past the point of maximum travel of coil former 241 in an annular gap (e.g., annular gap 109 in FIG. 1).

Heat conducing coil former 241 may be preferably made of a material with high thermal conductivity, such as aluminum or copper, to passively cool coil 243 by transferring the heat axially from the coil to a thermal bridge (e.g., thermal bridge 160 in FIG. 1) which transfers it to a speaker back plate (e.g., speaker back plate 106 in FIG. 1). Depending on the overall size of the speaker, a heat transfer rate of 100 watts or more may be provided by heat conducting coil former 241 and the thermal bridge.

It should be appreciated that cutting slits in heat conducing coil former 241 may weaken the structure and reduces the stiffness. The strength and stiffness of the coil assembly may be improved by the reinforcing sleeve 242. The reinforcing sleeve 242 may be preferably made of high strength nonconducting material, such as glass or carbon fiber composite. Reinforcing sleeve 242 may also attach the voice coil assembly 240 to a diaphragm (e.g., diaphragm 101 in FIG. 1). Reinforcing sleeve 242 may preferably be about 1 to 2 mm thick. The entire voice coil assembly 240 may be preferably vacuum filled with epoxy which also adds strength. The combination of the coil former 241, reinforcing sleeve 242, and epoxy fill, may result in a hybrid structure that may be equal or greater in strength and stiffness to a conventional solid former.

FIG. 3 is an exploded view 300 of the voice coil assembly 340 illustrating a heat conducting coil former 341, coils 343, and the reinforcing sleeve 342, according to an example embodiment. FIG. 3 also illustrates axial slits 345. The heat conducing coil former 341 includes coil groove 346. Coil 343 is preferably wound directly into coil groove 346 to ensure thermal contact between the coil and the coil former. Heat may be conducted both radially and axially from coil 343 into coil former 341.

Figure 4A:
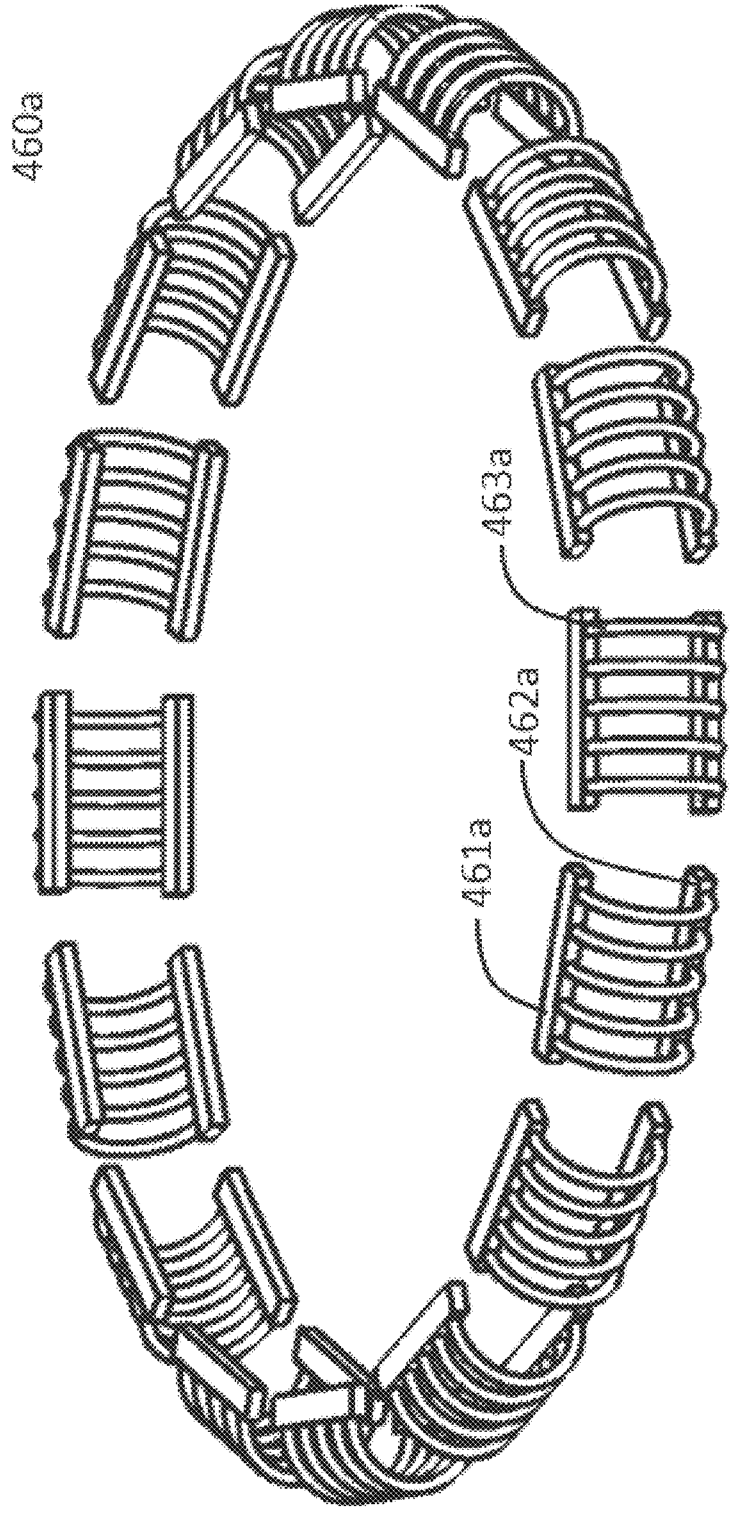
FIG. 4A is an isolated view of a thermal bridge according to a first example embodiment.
Figure 4B:
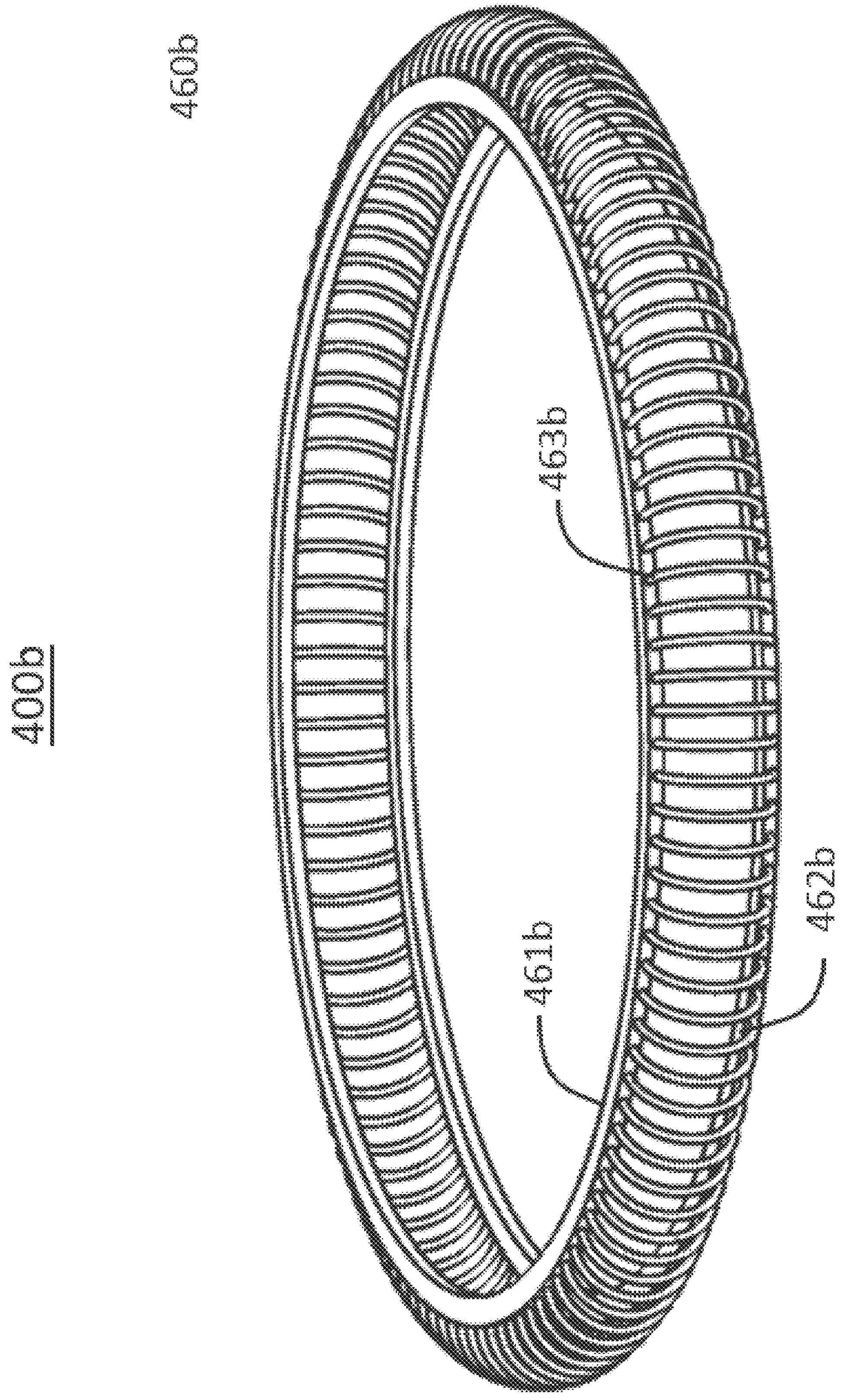
FIG. 4B is an isolated view of a thermal bridge according to a second example embodiment.

FIG. 4A is an isolated view 400*a* of a thermal bridge 460*a* according to a first example embodiment. As shown, thermal bridge 460*a* includes a number of top attachment bars 461*a* and bottom attachment bars 462*a* that are joined by flexible copper stranded wires 463*a*. Top attachment bars 461*a* may be in thermal contact with a heat conducting coil former (e.g., heat conducting coil former 241 in FIG. 2) and bottom attachment bars 462*a* may be in thermal contact with a speaker back plate (e.g., speaker back plate 106 in FIG. 1). Flexible copper stranded wires 463*a* conduct heat from top attachment bars 461*a* to bottom attachment bars 462*a* without adding significantly to the overall axial stiffness of a voice coil speaker (e.g., voice coil speaker 100 in FIG. 1).

Heat produced in a coil (e.g., coil 243 in FIG. 2) may be conducted radially and axially into the heat conducting coil former and then conducted axially by the heat conducting coil former to the thermal bridge 460*a* and then to the speaker back plate. By this method, the coil may be kept at a relatively low temperature and may be operated at a higher power than conventional speakers.

FIG. 48 is an isolated view 400*b* of a thermal bridge 460*b* according to a second example embodiment. As shown, thermal bridge 460*b* includes a top attachment ring 461*b* and bottom attachment ring 462*b* that are joined by flexible copper stranded wires 463*b*. Top attachment ring 461*b* may be in thermal contact with a heat conducing coil former (e.g., heat conducting coil former 241 in FIG. 2) and bottom attachment ring 462*b* may be in thermal contact with a speaker back plate (e.g., speaker back plate 106 in FIG. 1). Flexible copper stranded wires 463*b* conduct heat from top attachment bars 461*b* to bottom attachment bars 462*b* without adding significantly to the overall axial stiffness of a voice coil speaker (e.g., voice coil speaker 100 in FIG. 1).

Figure 4C:
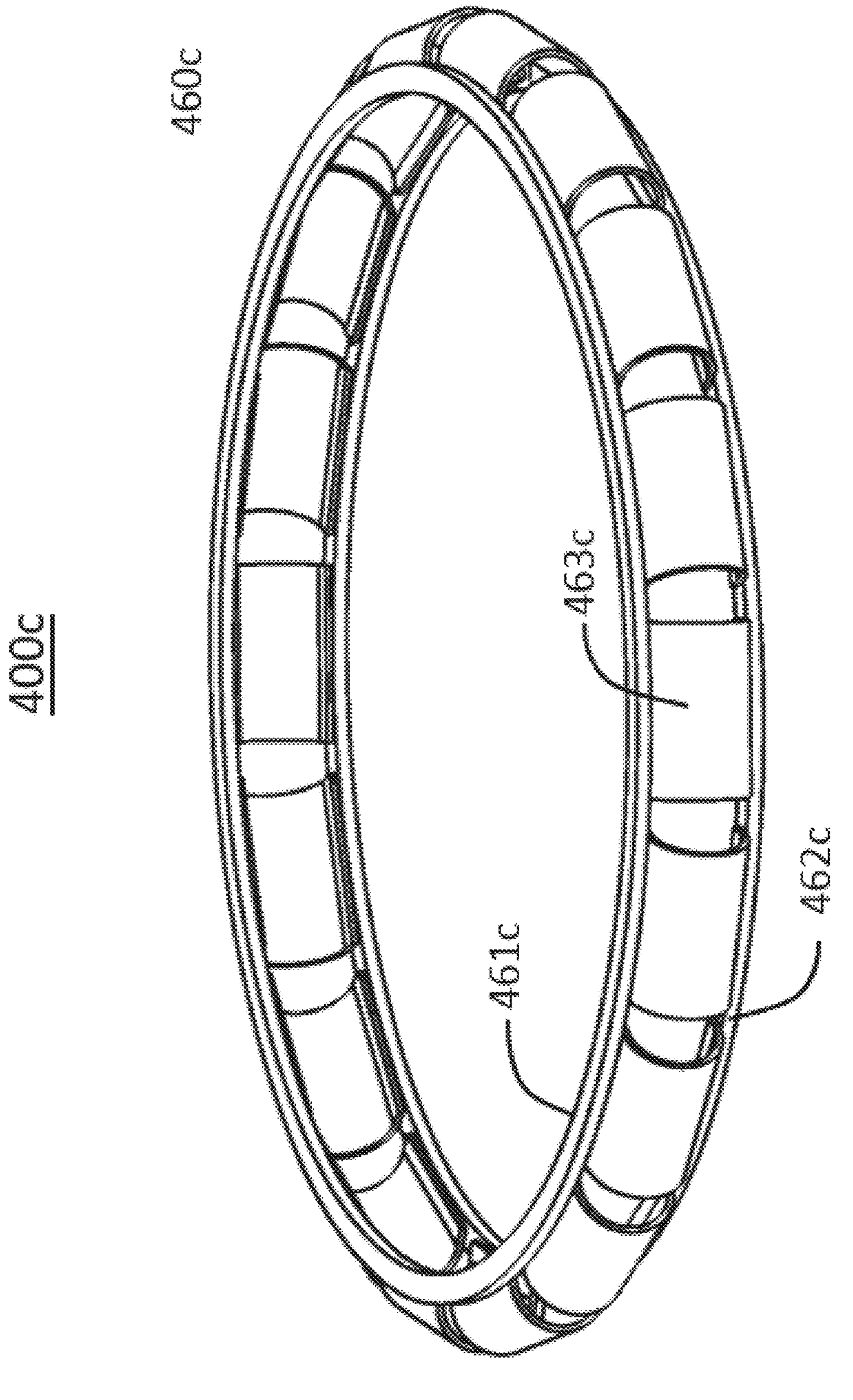
FIG. 4C is an isolated view of a thermal bridge according to a third example embodiment.

FIG. 4C is an isolated view 400*c* of a thermal bridge 460*c* according to a third example embodiment. As shown, thermal bridge 460*c* includes a top attachment ring 461*c* and bottom attachment ring 462*c* that are joined by flexible copper strips 463*c*. Top attachment ring 461*c* may be in thermal contact with a heat conducting coil former (e.g., heat conducting coil former 241 in FIG. 2) and bottom attachment ring 462*c* may be in thermal contact with a speaker back plate (e.g., speaker back plate 106 in FIG. 1). Flexible copper strips 463*c* may conduct heat from top attachment bars 461*c* to bottom attachment bars 462*c* without adding significantly to the overall axial stiffness of a voice coil speaker (e.g., voice coil speaker 100 in FIG. 1).

The example embodiments being thus described, it will be obvious that the same may be varied in many ways. Such variations are not to be regarded as a departure from the disclosed subject matter, and all such modifications are intended to be included within the scope of the disclosed subject matter.

What is claimed is:

1. A voice coil speaker comprising:
- a speaker frame;
- a diaphragm connected to the speaker frame and configured to be capable of axial movement;
- an axially polarized permanent magnet;
- a back plate;
- a heat conducting coil former connected to the diaphragm, and surrounded by a sleeve;
- a pole piece, wherein the pole piece and the back plate form an annular gap and conduct magnetic flux from the axially polarized permanent magnet in a complete loop that includes the annular gap;
- a voice coil wound on the heat conducting coil former and residing in the annular gap, the magnetic flux passing through the voice coil in the radial direction, such that the voice coil produces an axial force to cause the diaphragm to produce sound; and
- a thermal bridge configured to conduct heat from the heat conducting coil former to the back plate,
- wherein the heat conducting coil former includes a groove into which the voice coil is wound to ensure thermal contact between the voice coil and the heat conducting coil former, the groove being an opening within the heat conducting coil former and covered by the sleeve, such that the voice coil is enclosed within the heat conducting coil former and covered by the sleeve.

2. The voice coil speaker of claim 1, wherein
- the axial force is produced by the interaction of the voice coil with the radial magnetic field when subjected to electrical current flow,
- the axial force causes axial movement of the diaphragm; and
- the diaphragm causes alternating compression and rarefaction of the contacting air to produce the sound.

3. The voice coil speaker of claim 1, wherein heat is conducted radially and axially from the voice coil into the heat conducting coil former.

4. The voice coil speaker of claim 1, wherein the heat conducting coil former is made of material with high thermal conductivity and conducts heat from the voice coil axially to the thermal bridge.

5. The voice coil speaker of claim 4, wherein the material with high thermal conductivity is at least one of aluminum or copper.

6. The voice coil speaker of claim 1,
- wherein the heat conducting coil former includes a plurality of axial slits to prevent eddy currents from being induced in the heat conducting coil former by a current through the voice coil or by relative motion of the heat conducting coil former with the magnetic field in the annual gap,
- wherein the plurality of axial slits extend past a point of maximum travel of the heat conducting coil former in the annular gap.

7. The voice coil speaker of claim 1, wherein the heat conducting coil former is reinforced by the sleeve, the sleeve being made of high strength nonconducting material, the sleeve being attached with epoxy, the epoxy filling the slits in the heat conducting coil former and resulting in a hybrid structure.

8. The voice coil speaker of claim 7, wherein the high strength nonconducting material is at least one of glass or a carbon fiber composite.

9. The conductively cooled voice coil speaker of claim 1, wherein the thermal bridge comprises:
- top attachment bars;
- bottom attachment bars; and
- flexible copper stranded wires that join the top attachment bars and the bottom attachment bars, wherein the flexible copper stranded wires conduct heat between the top attachment bars and the bottom attachment bars.

10. The conductively cooled voice coil speaker of claim 1, wherein the thermal bridge comprises:
- a top attachment ring;
- a bottom attachment ring; and
- flexible copper stranded wires that join the top attachment ring and the bottom attachment ring, wherein the flexible copper stranded wires conduct heat between the top attachment ring and the bottom attachment ring.

11. The conductively cooled voice coil speaker of claim 1, wherein the thermal bridge comprises:
- a top attachment ring;
- a bottom attachment ring; and
- flexible copper strips that join the top attachment ring and the bottom attachment ring, wherein the flexible copper strips conduct heat between the top attachment ring and the bottom attachment ring.

12. The conductively cooled voice coil speaker of claim 1, wherein the voice coil is surrounded on three of four sides by the heat conducting coil former.

13. The conductively cooled voice coil speaker of claim 6, wherein the plurality of axial slits have the same configuration along the groove of the heat conducting former such that the plurality of axial slits are configured to surround the voice coil on three sides and are covered by the sleeve on a fourth side.

* * * * *